(12) United States Patent
Kelin et al.

(10) Patent No.: US 8,504,289 B2
(45) Date of Patent: Aug. 6, 2013

(54) METHOD AND APPARATUS FOR CONTROLLING DATA COMMUNICATION UNITS IN NAVIGATION RECEIVER

(75) Inventors: Timur G. Kelin, Moscow (RU); Andrey V. Zasorin, Moscow (RU); Nikolay A. Vazhenin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 141 days.

(21) Appl. No.: 13/296,200

(22) Filed: Nov. 14, 2011

(65) Prior Publication Data
US 2012/0323489 A1 Dec. 20, 2012

(51) Int. Cl.
*G01C 21/12* (2006.01)
(52) U.S. Cl.
USPC ............... 701/469; 367/117; 342/357.24
(58) Field of Classification Search
USPC ............ 701/469, 470, 400; 455/435.2, 434, 455/552.1
See application file for complete search history.

(56) References Cited

U.S. PATENT DOCUMENTS
6,934,544 B2 * 8/2005 Cooper et al. ............. 455/435.2
* cited by examiner

*Primary Examiner* — Thomas Black
*Assistant Examiner* — Luke Huynh
(74) *Attorney, Agent, or Firm* — Bardmesser Law Group (57) ABSTRACT

Navigation data processing system, comprising a navigation receiver that receives a positioning signal; a data communication subsystem comprising a plurality of data communication units for receiving correction signal and routing it to the navigation receiver, and conversion interfaces for communicating the correction data in a common format. The navigation receiver includes a navigation subsystem that generates augmented navigation data based on the positioning and correction signals. A user terminal displays the augmented data. Navigation receiver includes a profile database comprising a plurality of profiles for receiving the correction signal; a script database comprising commands for controlling a particular data communication unit. Navigation receiver sets up communication to the correction signal source, processes the positioning and correction signals and generates the augmented data based on a script and a profile of the data communication unit and the interface converter.

22 Claims, 4 Drawing Sheets

METHOD AND APPARATUS FOR CONTROLLING DATA COMMUNICATION UNITS IN NAVIGATION RECEIVER

FIELD OF THE INVENTION

The present invention is related to data communication systems, and, more particularly to controlling data communication units which are connected to a navigation receiver.

BACKGROUND OF THE INVENTION

The problem of managing miscellaneous communications units can arise, for example, in operation of navigation receivers receiving satellite signals from global navigation satellite systems, such as GPS, GLONASS, etc., and transmitting and/or receiving differential corrections through one or several radio communications channels. GSM, UMTS, Wi-Fi and others can serve as such radio data communication channels. Corresponding units for data communication are connected to a navigation receiver.

There are known different methods and apparatuses that provide control of communications units, see, for example U.S. Pat. Nos. 6,934,544, 5,517,677, 5,832,367, 6,324,400 and some others.

However, the technical solutions described therein cannot be fully applied to managing of data communication units connected to navigation receivers, because they lack required functionality and control flexibility.

For example, the main drawback of U.S. Pat. No. 6,934,544 is an impossibility of providing the required functionality and versatility to control data communications units.

The present invention is intended to eliminate the disadvantages of the prior art.

SUMMARY OF THE INVENTION

The effects of the invention are achieved by implementation of the hierarchy of the commands to control data communication units. The commands are grouped into profiles and scripts. Each profile describes a configuration of the data communication units and has its own set of scripts specific to the given configuration of the data communication units.

The present method and apparatus have processing commands in two different units: in a profile and script execution sub-system, and in a command execution sub-system, while data streams are commutated with a switch.

Methods of controlling data reception and transmission units include the following operations:

(i) preliminary uploading of a set of scripts in a script database and a set of data describing user variables in a user database;

(ii) execution of the scripts in the script execution subsystem.

The present invention also includes:

(i) preliminary uploading of a set of profiles in the profile database;

(ii) receiving commands from a data terminal through a user port;

(iii) routing the received user commands in the command execution subsystem: (i) commands intended to control navigation subsystem are sent to the navigation subsystem;

(iv) commands intended to control profile and script execution are sent to the profile and script execution subsystem;

(v) based on the received commands, the profile and script execution subsystem reads a required profile from profile database and according to its contents starts executing corresponding scripts, which were read from script database, while the values of the needed user variables are taken from a user variables database;

(vi) during the scripts execution:

(vii) the profile and script execution subsystem can change user variables in the user variables database. The user variables can also be modified and read in accordance with commands from the command execution subsystem;

(viii) commands and control parameters for the data communication units generated in the profile and script execution subsystem can be routed to the data communication units via the switch and interface converters, while necessary data from data communication units is transferred to the profile and to the script execution subsystem via the same switch and interface converters and after processing—and then to the navigation subsystem;

(ix) data generated in the profile and script execution subsystem is routed to the data terminal via a user port;

(x) commands and parameters for the navigation subsystem control, which were generated in the profile and script execution subsystem, are routed via the switch and command execution subsystem into the navigation subsystem, from which the required data goes back to the profile and script execution subsystem, and then (after conversion), to the corresponding data communication unit via the switch and interface converters.

Conventional transceiver apparatuses include a data communication subsystem. In the present invention, navigation receiver and data terminal are included, the first output of the navigation receiver is connected to the data terminal input, and the first input of the navigation receiver is connected to the output of the data terminal. The second output of the navigation receiver is connected to the input of data communication subsystem, and the second input of the navigation receiver is connected to the output of the data communication subsystem.

DETAILED DESCRIPTION OF THE INVENTION

Figure 1:
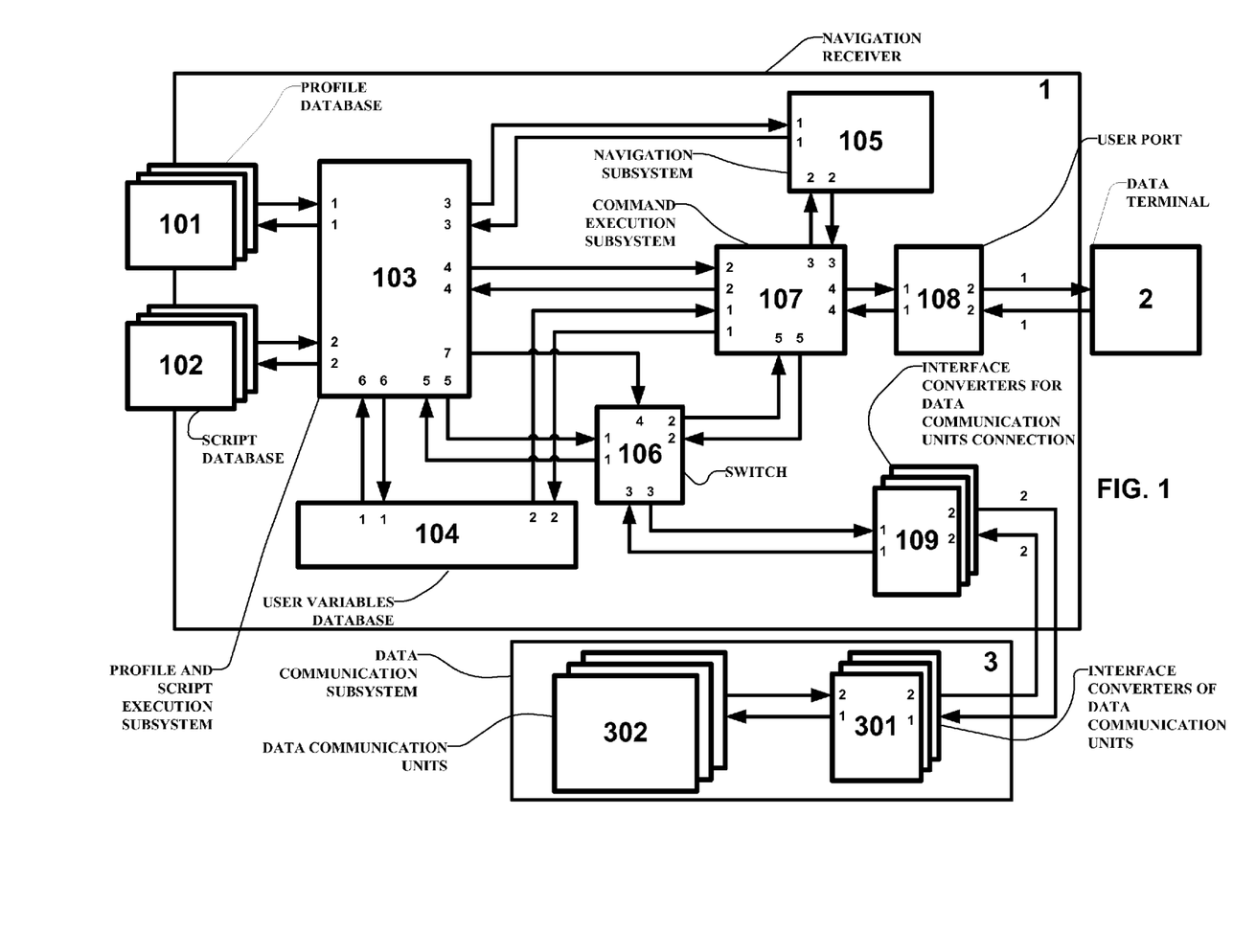
FIG. 1 illustrates a block diagram of the proposed apparatus.

Conventionally, to control data communication units in a navigation receiver, the following operations are performed (see FIG. 1):

(i) preliminary uploading of a set of scripts to a script database (102) and of a set of user variables to a user variables database (104), (ii) execution of scripts in a script execution subsystem (103).

The proposed method uses the following elements:

(i) a set of profiles is preliminarily uploaded to the profile database (101) (see FIG. 1), (ii) commands from the data terminal (2) (for example, a GPS navigator display with a keyboard, or a touch screen of a navigation device) are received via a user port (108), (iii) user commands are routed by a command execution subsystem (107): commands intended for controlling navigation subsystem are sent into navigation subsystem (105), while commands intended for controlling profiles and scripts execution are sent to the profile and script execution subsystem (103), (iv) based on the received commands, the profile and script execution subsystem (103) reads a required profile from the profile database (101) and, based on its contents, starts execution of the corresponding scripts that were read from the script database (102), while the values of the needed user variables are taken from the user variables database (104), e.g. PIN, remote part's phone number, IP-address, APN, etc.

(v) during execution of scripts by the profile and script execution subsystem (103):

(vi) values of the user variables can be modified in the user variables database (104). These values can be also changed and read directly with commands received from command execution subsystem (107);

(vii) commands and control parameters for data communication subsystem (3) generated in the profile and script execution subsystem (103) are sent to data communication units (302) via a switch (106) and interface converters (109 and 301), while data from the data communication units (302) are sent to the profile and script execution subsystem (103) via the same the interface converters (109 and 301) and the switch (106). After the conversion in the profile and script execution subsystem (103), the data is sent to the navigation subsystem (105);

(viii) data generated in the profile and script execution subsystem (103) is sent to the data terminal (2) via a command execution subsystem (107) and the user port (108); and (ix) commands and control parameters for navigation subsystem (105) generated in the profile and script execution subsystem (103) are sent to navigation subsystem (105) via the switch (106) and command execution subsystem (107); from navigation subsystem (105) the required data goes back to the profile and script execution subsystem (103) and after conversion—to a corresponding data communication unit (302) via the switch (106) and the interface converters (109 and 301).

Another embodiment of the proposed invention includes a method where the data terminal (2) initially uploads a set of scripts into the script database (102) and a set of profiles into the profile database (101) via the user port (108), command execution subsystem (107), the switch (106) and the profile and script execution subsystem (103) connected in series. In this case, the user can update the script and profile databases, when one or several components of the communication subsystem or the whole subsystem (3) are replaced, as well as when an algorithm of interacting with the communication subsystem (3) is modified.

Another embodiment of the present invention includes a method where execution of profiles from the profile database (101) and scripts from the script database (102) is implemented by the profile and script execution subsystem (103), taking into account the type of connected communication subsystem as a set of communication units (301), e.g., Wi-Fi or Bluetooth modules, cellular or satellite modems, radio modems, etc., information about which is delivered from data communication subsystem (3) via interface converters of data communication units (301, 109), the switch (106), command execution subsystem (107) and the profile and script execution subsystem (103) connected in series. That means automatic identification of connected communication units is possible.

Another embodiment of the present invention includes a method where uploading an additional set of scripts into the script database (102) and additional set of profiles into the profile database (101) is implemented from data communication system (3) via interface converters of data communication units (301, 109), the switch (106), command execution subsystem (107) and the profile and script execution subsystem (103) connected in series. In this case, automatic synchronization of script and profile sets is provided when one or more components of the data communication subsystem or the whole subsystem are changed.

Conventional apparatuses comprise data communication subsystem (3). In the proposed apparatus (FIG. 1), there is a navigation receiver (1) and the data terminal (2), the first output of the navigation receiver (1) being connected to the input of the data terminal (2), and the first input of the navigation receiver (1) is connected to the output of the data terminal (2); the second output of the navigation receiver (1) is connected to the input of data communication subsystem (3), and the second input of the navigation receiver (1) is connected to the output of data communication subsystem (3).

An embodiment of the proposed invention is an apparatus where the navigation receiver (1) comprises:
the profile database (101),
the script database (102),
the user variables database (104),
the navigation subsystem (105),
the switch (106),
the command execution subsystem (107),
the user port (108),
the interface converters for data communication units connection (109),
where:

The first input of the profile and script execution subsystem (103) is connected to the output of the profile database (101), the second input of profile and script execution subsystem (103) is connected to the output of the script database (102), the third input of profile and script execution subsystem (103) is connected to the first output of navigation subsystem (105). The fourth input of profile and script execution subsystem (103) is connected to the second output of the command execution subsystem (107), the fifth input of profile and script execution subsystem (103)—to the first output of the switch (106), the sixth input of profile and script execution subsystem (103)—to the first output of the user variables database (104).

The first output of profile and script execution subsystem (103) is connected to the input of the profile database (101), the second output of profile and script execution subsystem (103)—to the input of the script database (102), the third output of profile and script execution subsystem (103)—to the first input of navigation subsystem (105). The fourth output of profile and script execution subsystem (103) is connected to the second input of the command execution subsystem (107), the fifth output of profile and script execution subsystem (103)—to the first input of the switch (106), the sixth output of profile and script execution subsystem (103)—to the first input of the user variables database (104), and the seventh output of profile and script execution subsystem (103)—to the control fourth input of the switch (106).

The first input of the command execution subsystem (107) is connected to the second output of the user variables database (104), the second input of which is connected to the first output of the command execution subsystem (107), the third output of the command execution subsystem (107) is connected to the second input of navigation subsystem (105). The fourth output of the command execution subsystem (107) is connected to the first input of the user port (108), the fifth output of the command execution subsystem (107)—to the second input of the switch (106), the third input of the command execution subsystem (107) is connected to the second output of navigation subsystem (105). The fourth input of the command execution subsystem (107) is connected to the first output of the user port (108), the fifth input of the command execution subsystem (107) is connected to the second output of the switch (106).

The third outputs of the switch (106) are connected to the corresponding first inputs of interface converters for data communication units connection (109) used for connecting data communication subsystem (3), and the third inputs of the switch (106) are connected to the corresponding first outputs of interface converters for data communication units connection (109) used for connecting data communication subsystem (3).

The second output of the user port (108) is the first output of the navigation receiver (1), the second input of the user port (108) is the first input of the navigation receiver (1).

The second outputs of interface converters for the data communication units connection (109) used for connecting the data communication subsystem (3) are the second outputs of the navigation receiver (1), and second inputs of interface converters for the data communication units connection (109) used for connecting data communication subsystem (3) are the second inputs of the navigation receiver (1).

Another embodiment of the proposed invention is an apparatus wherein data communication subsystem (3) includes interface converters of data communication units (301) and the data communication units (302) themselves, the second outputs and first inputs of interface converters of data communication units (301) are respectively outputs and inputs of data communication subsystem (3). The first outputs of interface converters of data communication units (301) are connected to the corresponding inputs of the data communication units (302). The second inputs of interface converters of data communication units (301) are connected to the corresponding outputs of the data communication units (302).

Figure 2:
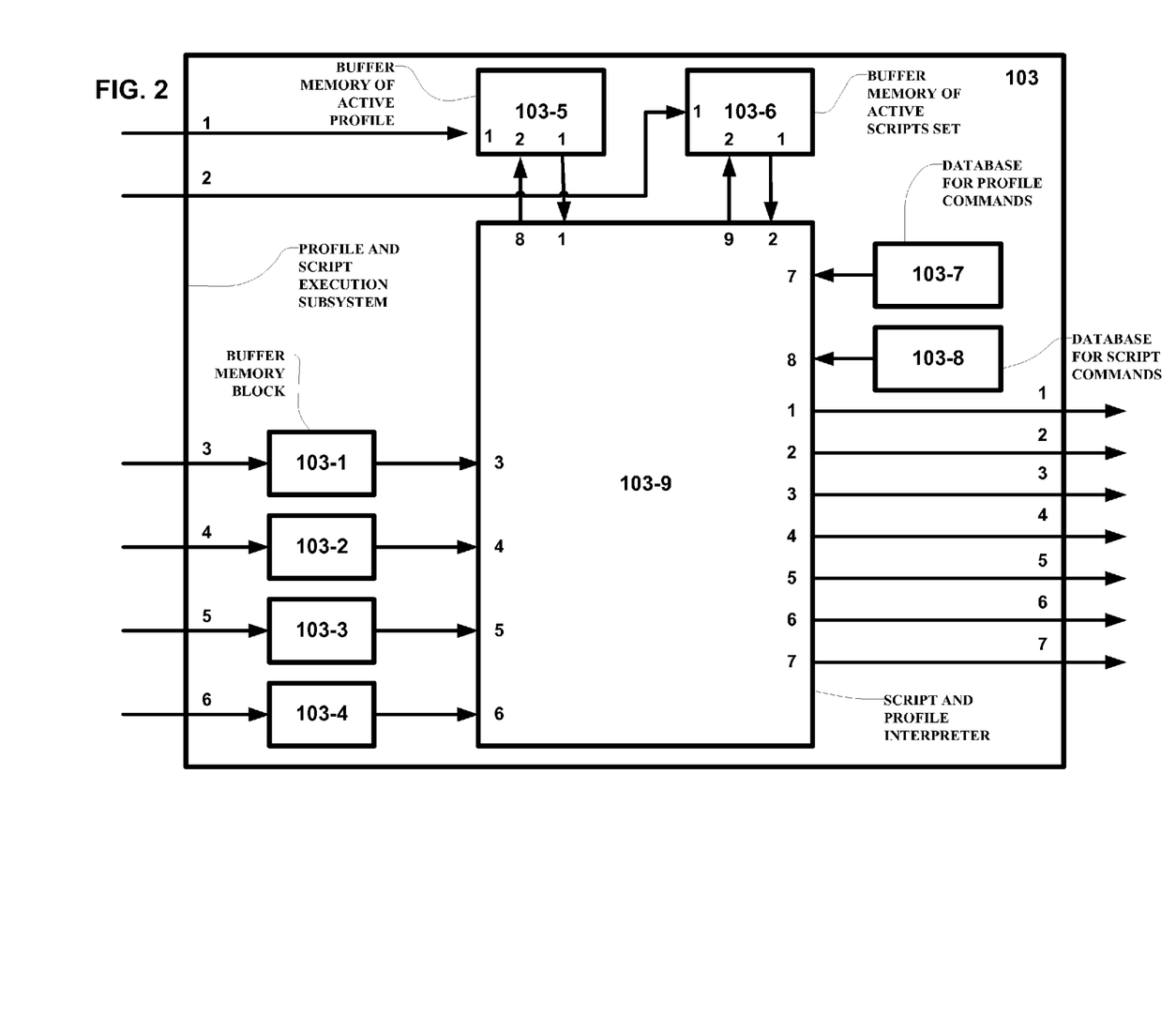
FIG. 2 shows an embodiment of the profile and script execution subsystem.

Another embodiment of the present invention is an apparatus where profile and script execution subsystem (103) consists of four similar blocks of buffer memory (103-1 . . . 103-4), buffer memory of the active profile (103-5), buffer memory of active scripts set (103-6), database for profile commands (103-7), database for script commands (103-8) and the script and profile interpreter (103-9). The first and second inputs of profile and script execution subsystem (103) are respectively connected to the corresponding inputs of the script and profile interpreter (103-9) via buffer memory of the active profile (103-5) and buffer memory of active scripts set (103-6), inputs 3 . . . 6 of profile and script execution subsystem (103) are connected to the corresponding inputs of script and profile interpreters (103-9) via buffer memory blocks (103-1 . . . 103-4). Outputs of database for profile commands (103-7) and database for script commands (103-8) are correspondingly connected to the seventh and eighth inputs of the script and profile interpreter (103-9). Outputs 1 . . . 7 of the script and profile interpreters (103-9) are the corresponding outputs of the profile and script execution subsystem (103). The ninth and tenth outputs of the script and profile interpreter (103-9) are correspondingly connected to the second inputs of buffer memory of the active profile (103-5) and buffer memory of active scripts set (103-6).

Figure 4:
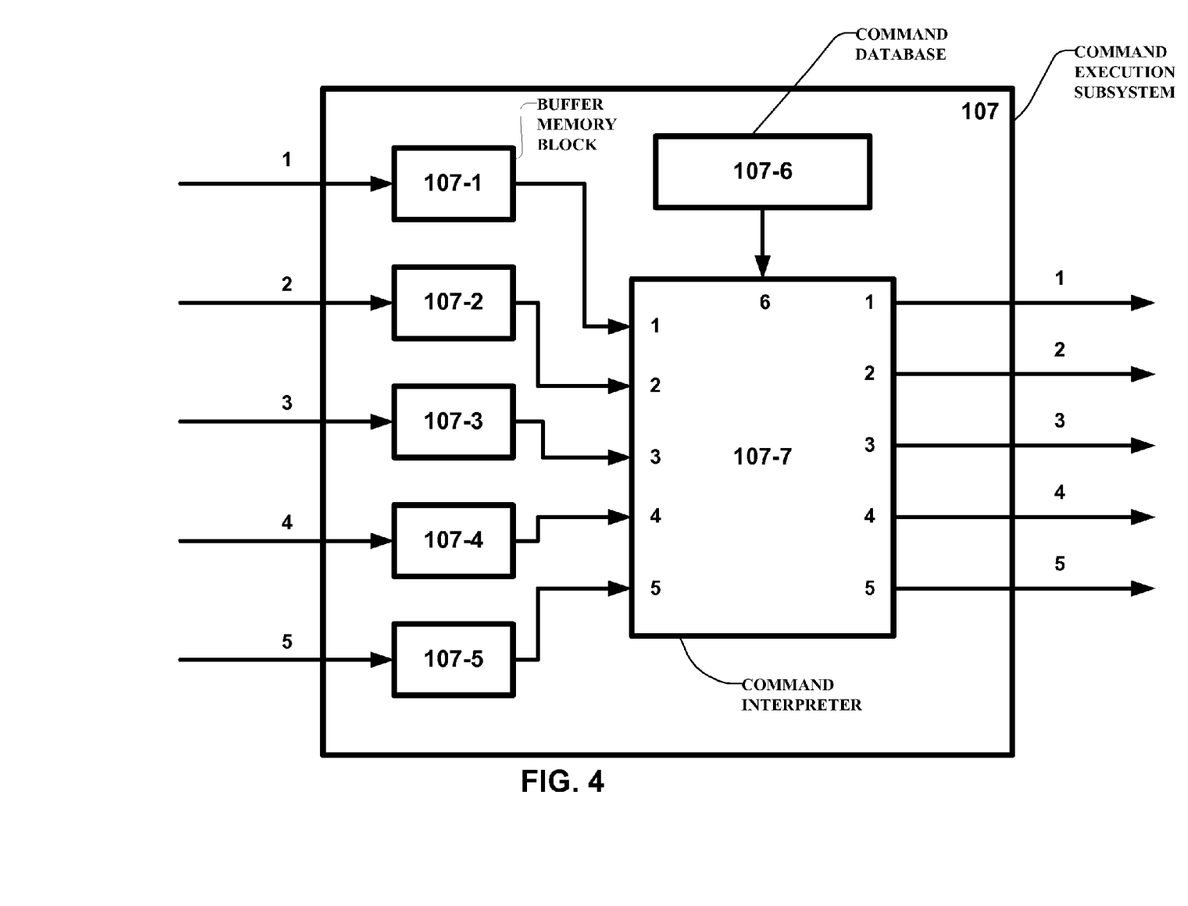
FIG. 4 shows an embodiment of a command execution subsystem.

Another embodiment of the proposed invention is an apparatus where the command execution subsystem (107) includes five similar blocks of buffer memory (107-1 . . . 107-5), command database (107-6), and the command interpreter (107-7), where all five inputs of the command execution subsystem (107) are connected to the corresponding inputs of command interpreter (107-7) via buffer memory (107-1 . . . 107-5). The output of the command database (107-6) is connected to the sixth input of command interpreter (107-7). All five outputs of command interpreter (107-7) are the corresponding outputs of the command execution subsystem (107).

The described apparatus operates as follows. The navigation receiver (1) measures its antenna's phase center position based on received and processed satellite signals. The navigation receiver is controlled with the commands generated by the data terminal (2). Position measurement results obtained by the navigation receiver (1) are sent to the data terminal (2). To enhance positioning accuracy, the navigation receiver (1) can transmit and/or receive differential corrections. The corrections are normally transmitted and/or received using one or another data communication channel (GSM, UMTS, Wi-Fi, etc.). To perform this operation, data communication subsystem (3), with one or several the data communication units (302), is connected to the navigation receiver (3).

The navigation receiver (1) through its input 1 receives commands from the data terminal (2). The commands pass through interface converter (108) and arrive at input 4 of the command execution subsystem (107). Also commands can be delivered to input 5 of the command execution subsystem (107) from output 5 of profile and script execution subsystem (103) via the switch (106). Depending on the command code, the command execution subsystem (107) further performs one of the following operations:

(i) at its output 1, generating a request to write a particular user variable to the user variables database (104);

(ii) at its output 1, generating a request to read a particular user variable from the user variables database (104) and then at input 1 receiving the value of the variable been requested to read;

(iii) at its output 2, generating a request to write one of permitted internal variables, which determines the functioning of profile and script execution subsystem (103), to profile and script execution subsystem (103);

(iv) at its output 2, generating a request to read one of permitted internal variables, which determines functioning subsystem (103), from profile and script execution subsystem (103) and at input 2 receiving the value of the variable been requested to read;

(v) at its output 3, generating a request to write one of permitted internal variables to navigation subsystem (105);

(vi) at its output 3, generating a request to read one of permitted internal variables from navigation subsystem (105) and at input 3, receiving the value of the requested variable.

Upon execution of one of the specified operations and depending on the result, the command execution subsystem (107) generates a message acknowledging successful completion of the executed operation, a message with the value of the variable been read or an error message. These messages are generated at output 4 if the command has been received at input 4, or at output 5 if the command has been received at input 5.

A detailed description of the command execution subsystem (107) functioning is given below.

After the data terminal (2) has been switched on or connected for navigation data exchange, it generates a command sequence, which is processed by the command execution subsystem (107) and provides uploading of a profile into buffer memory of the active profile (103-5), and a set of scripts into buffer memory of active scripts set (103-6). The profile determines a connection type and/or a communication protocol, according to which the connection is established, data is transmitted and/or received and connection is terminated, as well as parameters of the protocol. Each script from the set determines a sequence of operations to be performed by profile and script execution subsystem (103) at different stages of the connection set up, connection termination and during a data communication phase for the connected data communication subsystem (3).

Uploading a profile to buffer memory of the active profile (103-5) and a set of scripts to buffer memory of the active script set (103-6) is implemented in one of the following ways:

(i) Data and commands of the profile, as well as a sequence of mnemonic operation codes for each script from the set, are transmitted from the data terminal (2) into the buffer memory of the active profile (103-5) and into the buffer memory of the active script set (103-6) via the user port (108), the command execution subsystem (107), the buffer memory block (103-2) and the script and profile interpreter (103-9);

(ii) The data communication subsystem (3) stores a database of scripts and a database of profiles that are specific for the given communication subsystem (3). Data and commands of the profile are transmitted from the data communication subsystem (3) into the buffer memory of the active profile (103-5). Sequences of mnemonic operation codes for each script from the script set are transmitted from the data communication subsystem (3) into the buffer memory of the active script set (103-6). Data and commands of the profile as well as sequences of mnemonic operation codes are transmitted via interface converters for data communication units connection (109), the switch (106), buffer memory block (103-3) and script and profile interpreter (103-9);

(iii) Indices of an active profile in the profile database (101) and of an active script set in the script database (102) are transmitted from the data terminal (2) via the user port (108), the command execution subsystem (107), and the buffer memory block (103-2) to the script and profile interpreter (103-9). According to these indices, the script and profile interpreter (103-9) correspondingly uploads an active profile from the profile database (101) and active script set from the script database (102) into buffer memory of the active profile (103-5) and into buffer memory of the active script set (103-6);

(iv) Indices of an active profile in the profile database (101) and of an active script set in the script database (102) are transmitted from data communication subsystem (3) via interface converters for data communication units connection (109), the switch (106), buffer memory block (103-3) and script and profile interpreter (103 9). According to these indices, the script and profile interpreter (103-9) correspondingly uploads an active profile from the profile database (101) and active script set from the script database (102) into buffer memory of the active profile (103-5) and into buffer memory of the active script set (103-6);

Contents of the profile database (101) and the script database (102) are obtained in the following ways:

(i) generated at the stage of assembling the navigation receiver (1), considering possible versions of connected data communication subsystems (3);

(ii) taken from the data terminal (2) via the user port (108), the command execution subsystem (107), the buffer memory block (103-2) and the script and profile interpreter (103-9); the same approach can be used to fully or partially replace and/or update the profile database (101) and the script database (102);

(iii) taken from data communication subsystem (3), which includes profile and script databases unique for the given subsystem, via the interface converter for data communication units connection (109), the switch (106), buffer memory block (103-3) and the script and profile interpreter (103-9); the same approach can be used to fully or partially replace and/or update the profile database (101) and the script database (102).

The data terminal (2) also generates a sequence of commands, which are processed by the command execution subsystem (107), and provides initialization of variables in the user variables database (104) to establish and terminate a connection, as well as to perform data communication, e.g., PIN-code, IP-address, etc.

To establish a connection for navigation data receiving and/or transmitting, the data terminal (2) generates a command, which comes to the script and profile interpreter (103-9) via the user port (108), the command execution subsystem (107) and buffer memory block (103 2). The script and profile interpreter (103-9) uses data from the buffer memory of the active profile (103-5) and sets the parameters of internal data conversion blocks of the script and profile interpreter (103-9) in accordance with parameters of the active profile. After that, according to the active profile data, a control signal is generated at output 7 of the script and profile interpreter (103-9), which puts the switch (106) in a position of data communication between profile and script execution subsystem (103) and navigation subsystem (105) via the switch (106) and the command execution subsystem (107).

Then the script and profile interpreter (103-9), using data from the buffer memory of the active script set (103-6) and the user variables database (104), sends commands which are further transformed within the command execution subsystem (107). The commands are passed into control inputs for navigation subsystem (105), thereby setting parameters of the internal blocks of navigation subsystem (105) for the required mode of reception and/or transmission of navigation data. After that, based on the active profile data, a control signal is generated at output 7 of the script and profile interpreter (103-9). The control signal puts the switch (106) in a position of data communication between profile and script execution subsystem (103) and one of interface converters for data communication units connection (109) and further with corresponding interface converter of data communication units (301) and active data communication unit (302). The active data communication unit (302) is intended to perform receiving and/or transmitting of the navigation data in a communication session.

Then the script and profile interpreter (103-9), using data from the buffer memory of the active script set (103-6) and the user variables database (104), via one of interface converters for data communication units connection (109) and one of interface converters of data communication units (301), implements data exchange (exchange of control commands) with the data communication unit (302) that is going to receive and/or transmit navigation data in the given communication session. As a result, a connection is established, or a decision about a connection set up failure is made. During the connection, set up the script and profile interpreter (103-9) can change variables in the user variables database (104), which can be read by the data terminal (2) via the user port (108) and the command execution subsystem (107) to obtain the current state of the connection set up.

When a chosen data communication unit (302) receives navigation data, navigation data is routed to profile and script execution subsystem (103) via one of interface converters of data communication units (301), one of interface converters for data communication units connection (109) and the switch (106). In profile and script execution subsystem (103), data is transformed by the internal processing block of the script and profile interpreter (103-9) and (after transformation) go to navigation subsystem (105).

When a chosen data communication unit (302) transmits data, navigation data come from navigation subsystem (105) to profile and script execution subsystem (103), where it is transformed by the internal processing block of the script and profile interpreter (103-9), and, after transformation goes to the chosen data communication unit (302) via the switch (106), one of interface converters of data communication units connection (109) and one of interface converters of data communication units (301).

During reception and/or transmission of navigation data, the script and profile interpreter (103-9) can change variables in the user variables database (104), which can be read by the data terminal (2) via the user port (108) and the command execution subsystem (107) to obtain the current state of the data communication process.

To terminate the connection, the data terminal (2) generates a command which goes to the script and profile interpreter (103-9) via the user port (108), the command execution subsystem (107) and the buffer memory block (103-2). The script and profile interpreter (103-9) using data from the buffer memory of active scripts set (103-6) and the user variables database (104), via one of interface converters for data communication units connection (109) and one of interface converters of data communication units (301) exchanges data (control commands) with the data communication unit (302) that receives and/or transmits navigation data in the given communication session. As a result, the connection is terminated or a decision about refusing of the connection termination is made. Then, at output 7 of the script and profile interpreter (103-9), depending on the active profile information a control signal is generated, which sets the switch (106) into a state of exchanging data between profile and script subsystem (103) and navigation subsystem (105), via the switch (106) and the command execution subsystem (107). Then, the script and profile interpreter (103-9) depending on data from the buffer memory of active scripts set (103-6) and the user variables database (104), sends commands to the command execution subsystem (107), where they are transformed into control inputs for navigation subsystem (105), thereby setting parameters of internal blocks of navigation subsystem (105) matched with connection termination state. During the connection, termination the script and profile interpreter (103-9) can change variables in the user variables database (104), which can be read by the data terminal (2) via the user port (108) and the command execution subsystem (107), in order to obtain the current state of the connection termination.

During its operation, profile and script execution subsystem (103) receives control instructions from the command execution subsystem (107) at input 4. The control instructions pass through the buffer memory block (103-2) and are applied to the input 4 of the script and profile interpreter (103-9). A response to the applied control instruction is generated at output 4 of the script and profile interpreter (103-9), which goes to the command execution subsystem (107). A response of the script and profile interpreter (103-9) can include an internal variable of profile and script execution subsystem (103) if a "read" instruction has been sent by the command execution subsystem (107), execution status data if a "write" instruction has been sent by the command execution subsystem (107), or an error message if, (for example,) a nonexistent variable has been addressed.

If a "write" instruction, and the data of an active profile and an active script set to be uploaded come at input 4 of profile and script execution subsystem (103), then, after reading the active profile data from the buffer memory block (103-2) by the script and profile interpreter (103-9), this data is transmitted from output 9 of the script and profile interpreter (103-9) to input 2 of active profile buffer memory of the active profile (103-5) and stored to buffer memory of the active profile (103-5). Meanwhile, the sequence of mnemonic operation codes of each script belonging to the active script set is transmitted from output 10 of the script and profile interpreter (103-9) to input 2 of active script buffer memory of active scripts set (103-6), and stored to buffer memory of the active scripts set (103-6).

If a "read" instruction, and references for reading an active profile from the profile database (101) and active script set from the script database (102) come to input 4 of profile and script execution subsystem (103), then, after reading from buffer memory block (103 2) by the script and profile interpreter (103-9), a reference to the active profile in the profile database (101) is generated at output 1, and a reference to active scripts set in the script database (102) is generated at output 2 of the script and profile interpreter (103-9). Based on the reference at its input, the profile database (101) transmits the active profile data at its output, which goes to input 1 of profile and script execution subsystem (103) and further to input 1 of buffer memory of the active profile (103-5). The active profile data is stored to the buffer memory of the active profile (103-5). Based on the reference at its input, the script database (102) transmits a sequence of operation mnemonic codes of each script of active script set which go to input 2 of profile and script execution subsystem (103) and further to input 1 of buffer memory of active scripts set (103-6). The sequence of mnemonic operation codes of each script of the active script set is stored to the buffer memory of active scripts set (103-6).

If one of the connection set up commands comes to input 4 of profile and script execution subsystem (103), then, after reading it from the buffer memory block (103-2) by the script and profile interpreter (103-9), a start address of the profile command sequence is generated at output 9. Mnemonic operation code located at this address is read from buffer memory of the active profile (103-5) and further sent to input 1 the script and profile interpreter (103-9). The script and profile interpreter (103-9) sequentially compares the mnemonic operation code at its input 1 and permitted operation patterns from profile command database (103-7). Depending on the match found, it may perform one of the following operations: a) adjust its internal units of data transformation; b) at its output 6, generate the requests to read variables from the user variables database (104) via buffer memory block (103-4); c) at output 6, generates requests to write variable values to the user variables database (104); d) at output 7, generate signals to control the switch (106); e) run separate scripts from buffer memory of the active script set (103-6); 0 perform other operations. After the current mnemonic operation code has been processed, the next address of the profile command sequence is generated. A new mnemonic code will be read at this address and interpreted.

When the script starts a start address of the script command sequence is generated at output 10 of the script and profile interpreter (103-9), a mnemonic operation code is read from the buffer memory of active scripts set (103-6) at this address, and is sent to input 2 of the script and profile interpreter (103-9). The script and profile interpreter (103-9) sequentially compares the mnemonic operation code at its input 2 with permitted operation patterns from script command database (103-8). Depending on the match found, it may perform one of the following: a) arithmetic operations; b) logic operations; c) conditional branching operations; d) generation of requests to read variables from the user variables database (104) at its output 6 via buffer memory block (103-4); e)

generation of requests to write variable values to the user variables database (104) at its output 6; 0 generation of signals to control the switch (106) at output 7; g) sending control commands and/or data to output 5; h) receiving of responses and/or data via buffer memory block (103-3) at input 5; i) transfer of data to output 3; j) receiving of data via buffer memory block (103-1) at input 3; and k) processing and conversion of data by internal data conversion units. After the current mnemonic operation code has been processed, the next address of the profile command sequence is generated. A new mnemonic code will be read at this address and interpreted.

During a receive operation, navigation data from data communication subsystem (3) is sent to input 5 of profile and script execution subsystem (103), and further to input 5 of the script and profile interpreter (103-9) via buffer memory block (103-3), where it is converted by internal data conversion units of the script and profile interpreter (103-9). After conversion navigation data comes at output 3 of the script and profile interpreter (103-9) and, finally, to navigation subsystem (105).

During a transmit operation navigation data from navigation subsystem (105) comes to profile and script execution subsystem (103), where it passes through buffer memory block (103-1) and transformed by internal data conversion units in the script and profile interpreter (103-9). After conversion, navigation data comes to output 5 of the script and profile interpreter (103-9), and, finally, to data communication subsystem (3).

During a receive and/or transmit operation, the script and profile interpreter (103-9) can change variables in the user variables database (104), which can be read by the data terminal (2) via the user port (108) and the command execution subsystem (107), in order to obtain the current state of the communication process.

A sequence of launching particular scripts from active script set, as well as selection of internal blocks and data transformation parameters of script and profile interpreter (103 9) during reception and/or transmission of navigation data, is determined by a profile. Each script from the active set determines the sequence of operations to be executed by profile and script execution subsystem (103) at different stages of connection set up and termination, as well as during data communication process for the used data communication subsystem (3), required navigation data types, and so on.

A limited set of control commands can be transmitted to input 5 of profile and script execution subsystem (103) from data communication subsystem (3) via one of interface converters for data communication units connection (109) and the switch (106), which then go to input 5 of the script and profile interpreter (103-9) via buffer memory block (103-3). These control inputs can be generated either during the data communication subsystem (3) initialization or upon request from profile and script execution subsystem (103). In this case, the request comes from output 5 of the script and profile interpreter (103-9) via the switch (106) and one of interface converters for data communication units connection (109), or upon request from the data terminal (2). In this case the request comes to input 2 of the user port (108), and then to input 4 of the command execution subsystem (107) via the switch (106) and one of interface converters for data communication units connection (109).

If a "write" instruction and data for uploading an active profile and an active script set are received at input 5 of profile and script execution subsystem (103), then after having been read from buffer memory block (103-3) by the script and profile interpreter (103-9), the active profile data is transmitted from output 9 of the script and profile interpreter (103-9) to input 2 of buffer memory (103-5), and is saved to buffer memory of the active profile (103-5), while the sequences of mnemonic operation codes for each script of the active script set are sent from output 10 of the script and profile interpreter (103-9) to input 2 of buffer memory (103-6) and are stored to buffer memory of active scripts set (103-6).

If a "read" instruction and references for reading an active profile from the profile database (101) and active script set from the script database (102) is received at input 5 of profile and script execution subsystem (103), then, after being read from buffer memory block (103-3) by the script and profile interpreter (103-9), a reference to the active profile in the profile database (101) is generated at output 1, and a reference to active script set in the script database (102) is generated at input 2 of the script and profile interpreter (103-9). Based on the reference at its input, the profile database (101) transmits the active profile data at its output which goes to input 1 of profile and script execution subsystem (103) and then to input 1 of buffer memory of the active profile (103-5). The active profile data is saved to the buffer memory of the active profile (103-5). Based on the reference at its input, the script database (102) transmits a sequence of mnemonic operation codes of each script for the active script set, which goes to input 2 of profile and script execution subsystem (103) and then to input 1 of buffer memory of active script (103-6). The sequences of mnemonic operation codes of each script of the active script set are saved to the buffer memory of active scripts set (103-6).

Figure 3:
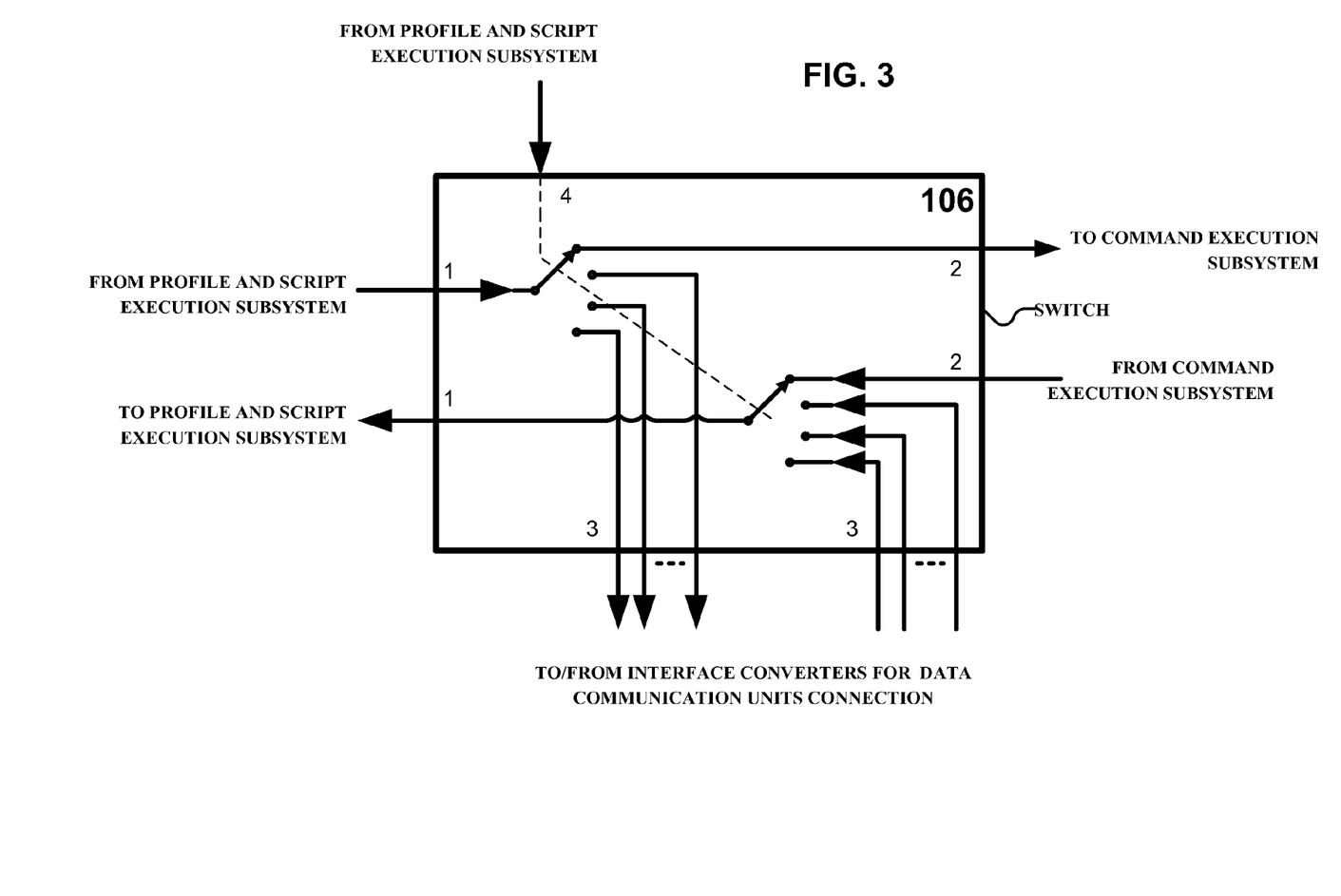
FIG. 3 shows a possible embodiment of the switch.

The switch (106) routes data from its data input 1 to data output 2 or to one of data outputs 3, as well as from its data input 2 or from one of data inputs 3 to data output 1 in dependence of the control input 4 state (see FIG. 3). When the control code at control input 4 takes a corresponding value, the switch (106) sends data from data input 1 to data output 2 and from data input 2 to data output 1, i.e., provides a data exchange between profile and script execution subsystem (103) and the command execution subsystem (107). With other values at control input 4, the switch (106) switches data from data input 1 to one of data outputs 3 and from one of data inputs 3 to data output 1, i.e., provides a data exchange between script execution subsystem (103) and one of interface converters for data communication units connection (109), which results in the possibility of data exchange between script execution subsystem (103) and one of the data communication units (302).

The command execution subsystem (107), at its input 4, receives commands from the data terminal (2) via the user port (108) and buffers them in buffer memory block (107-4). When the previous operation is completed, and there is available data in buffer memory block (107-4), command interpreter (107-7) analyzes the contents of buffer memory block (107-4) by sequentially comparing this contents with command patterns stored in the command database (107-6). Depending on the matched pattern command interpreter (107-7) executes one of the following operation sequences:

(i) generating a request at its output 1 to write one of user variables to the user variables database (104), where the mnemonic name or address of the variable and its value correspond to ones specified in those parts of the command received at input 4 that are intended to identify mnemonic name, address and value respectively; upon execution of the operation, a message about successful write operation is passed to output 4.

(ii) generating a request at its output 1 to read one of user variables from the user variables database (104), the mnemonic name or address of the variable correspond to ones specified in those parts of the command received at input 4 that are intended to identify mnemonic name or address respectively; when the value from the user variables database (104) is uploaded to buffer memory block (107-1), the command interpreter reads this value at input 1 and generates at output 4 a message with the value.

(iii) generating a request at its output 2 to write one of permitted variables to script execution subsystem (103), which defines functionality of subsystem (103), the mnemonic name or address of the variable and its value to be written correspond to ones specified in those parts of the command received at input 4 that are intended for identify mnemonic name, address and value respectively; upon execution of the operation, a message about successful write operation is passed to output 4.

(iv) generating a request at its output 2 to read one of permitted variables from script execution subsystem (103), which defines functionality of subsystem (103). The mnemonic name or address of the variable correspond to ones specified in those parts of the command received at input 4 that are intended to identify mnemonic name or address respectively; when the value from script execution subsystem (103) is uploaded to buffer memory block (107-2), the command interpreter reads this value at input 2 and generates at output 4 a message with the value.

(v) generating a request at its output 3 to write one of permitted variables to navigation subsystem (105), which defines functionality of subsystem (105). The mnemonic name or address of the variable and its value to be written correspond to ones specified in those parts of the command received at input 4 which are intended for identify mnemonic name, address and value respectively; upon execution of the operation a message about successful write operation is passed to output 4.

(vi) generating a request at its output 3 to read one of permitted variables from navigation subsystem (105), which defines functionality of subsystem (105). The mnemonic name or address of the variable correspond to ones specified in those parts of the command received at input 4, which are intended for identify mnemonic name or address respectively; when the value from navigation subsystem (105) is uploaded to buffer memory block (107-3), the command interpreter reads this value at input 3 and generates, at output 4, a message with the value.

If the content of buffer memory block (107-4) has not matched any of command patterns stored in the command database (107-6), then an error message is generated at output 4 of command interpreter (107-7) as a response.

As soon as a response is generated, command interpreter (107-7) clears buffer memory block (107-4) and switches it in standby mode to receive the next command from the user port (108).

The command execution subsystem (107), at its input 5, receives commands from profile and script execution subsystem (103) via the switch (106), and buffers them in buffer memory block (107-5). When the previous operation is completed, and there is available data in the buffer memory block (107-5), command interpreter (107-7) analyzes the contents of the buffer memory block (107-5) by sequentially comparing of this contents with command patterns stored in the command database (107-6). Depending on the matched pattern, command interpreter (107-7) executes one of the following operation sequences:

(i) generating a request at its output 1 to write one of user variables to the user variables database (104), the mnemonic name or address of the variable and its value to be written correspond to ones specified in those parts of the command received at input 5 that are intended for identify mnemonic name, address and value respectively; upon execution of the operation, a message about successful write operation is passed to output 5.

(ii) generating a request at its output 1 to read one of user variables from the user variables database (104), the mnemonic name or address of the variable correspond to ones specified in those parts of the command received at input 5 that are intended for identify mnemonic name or address respectively; when the value from the user variables database (104) is uploaded to buffer memory block (107-1), the command interpreter reads this value at input 1 and generates, at output 5, a message with the value.

(iii) generating a request at its output 2 to write one of permitted variables to script execution subsystem (103), which defines functionality of subsystem (103), the mnemonic name or address of the variable and its value to be written correspond to ones specified in those parts of the command received at input 5 that are intended for identify mnemonic name, address and value respectively; upon execution of the operation, a message about successful write operation is passed to output 5.

(iv) generating a request at its output 2 to read one of permitted variables from script execution subsystem (103), which defines functionality of subsystem (103), the mnemonic name or address of the variable correspond to ones specified in those parts of the command received at input 5 that are intended for identify mnemonic name or address respectively; when the value from script execution subsystem (103) is uploaded to buffer memory block (107-2), the command interpreter reads this value at input 2 and generates, at output 5, a message with the value.

(v) generating a request at its output 3 to write one of permitted variables to navigation subsystem (105), which defines functionality of subsystem (105), the mnemonic name or address of the variable and its value to be written correspond to ones specified in those parts of the command received at input 5 that are intended for identify mnemonic name, address and value respectively; upon execution of the operation a message about successful write operation is passed to output 5.

(vi) generating a request at its output 3 to read one of permitted variables from navigation subsystem (105) which defines functionality of subsystem (105), the mnemonic name or address of the variable correspond to ones specified in those parts of the command received at input 5 that are intended for identify mnemonic name or address respectively; when the value from navigation subsystem (105) is uploaded to buffer memory block (107-3), the command interpreter reads this value at input 3 and generates, at output 5, a message with the value been read.

If the content of the buffer memory block (107-5) has not matched any of command patterns stored in the command database (107-6), then an error message is generated at output 5 of command interpreter (107-7) as a response.

As soon as a response is generated, command interpreter (107-7) clears the buffer memory block (107-5) and switches it to standby mode to receive next command from profile and script execution subsystem (103) via the switch (106).

The proposed invention provides thus efficient control for communication units connected to a navigation receiver, as almost any required functionality and flexibility can be implemented on the basis of this technical solution.

What is claimed is:

1. A method of controlling data communication units in a navigation receiver comprising:
loading a set of scripts to a script database;
loading a set of user variables to a user variables database;

loading a set of profiles into a profile database;
executing the scripts in a script execution subsystem;
receiving commands from a terminal via a user port;
routing the user commands by a command execution subsystem, including sending commands for controlling a navigation subsystem to the navigation subsystem, and sending commands for controlling profiles and script execution to a profile and script execution subsystem;
based on the received commands, and using the profile and script execution subsystem, reading a corresponding profile from the profile database;
based on the profile, executing corresponding scripts that were read from the script database, using the values of the user variables from the user variables database,
wherein, during execution of the scripts:
(i) values of the user variables can be modified or received directly with the commands received from the command execution subsystem,
(ii) sending commands and control parameters for a data communication subsystem that are generated in the profile and script execution subsystem to data communication units via a switch and interface converters, while correction data from the data communication units is sent to profile and script execution subsystem via the switch and the interface converters, and, after a format conversion in the profile and script execution subsystem, the navigation data is sent to navigation subsystem,
(iii) sending data generated in the profile and script execution subsystem to the terminal via the command execution subsystem and the user port,
(iv) sending commands and control parameters for the navigation subsystem generated in the profile and script execution subsystem to the navigation subsystem via the switch and the command execution subsystem;
(v) sending navigation data from the navigation subsystem to the profile and script execution subsystem and, after a format conversion, to a corresponding data communication unit via the switch and the interface converters.

2. The method of claim 1, wherein initial uploading of a set of scripts into the script database and a set of profiles into the profile database is performed by the terminal via the user port, the command execution subsystem, the switch and profile and script execution subsystem, which are connected in series.

3. The method of claim 1, wherein execution of the profiles from the profile database and execution of the scripts from the script database is performed by the profile and script execution subsystem based on a type of communication subsystem connected, information about which is received from the data communication subsystem via the interface converters, the switch, the command execution subsystem and the profile and the script execution subsystem, connected in series.

4. The method of claim 1, further comprising uploading an additional set of scripts into the script database and additional set of profiles into the profile database from data communication subsystem via the interface converters, the switch, the command execution subsystem and the profile and script execution subsystem, connected in series.

5. A navigation data processing system, comprising:
a navigation receiver that receives a positioning signal from a satellite;
a data communication subsystem comprising a plurality of data communication units for receiving correction signal and routing the correction signal to the navigation receiver;
the data communication subsystem further comprising a plurality of conversion interfaces for communicating the correction data to the navigation receiver in a common format;
wherein the navigation receiver further comprises navigation subsystem which generates augmented navigation data based on the positioning signal and the correction signal; and
a user terminal that receives and displays the augmented navigation data from the navigation receiver,
wherein the navigation receiver further comprises:
a profile database comprising a plurality of profiles, each profile corresponding to a particular protocol for receiving the correction signal;
a script database comprising a plurality of scripts, each script comprising commands for controlling a particular data communication unit;
wherein the navigation receiver sets up communication to the correction signal source, processes the positioning signal and the correction signal and generates the augmented navigation data based on a script and a profile of the corresponding data communication unit and the corresponding interface converter.

6. The navigation data processing system of claim 5, wherein the navigation receiver further comprises a user variables database, the user variables database containing settings for the data communication units or protocols for receiving/transmitting a correction signal, and wherein values of variables in the user variables database are changed based on input from the user terminal.

7. The navigation data processing system of claim 6, further comprising a profile and script execution subsystem that receives profiles and scripts from the profiles database and the script database, and executes the scripts based on the profiles, and controls navigation data format conversion, and also controls values of the variables in the user variables database.

8. The navigation data processing system of claim 7, further comprising a command execution subsystem that executes commands for controlling the navigation subsystem, the user variables database and the profile and script execution subsystem.

9. The navigation data processing system of claim 8, wherein the data communication subsystem establishes a connection to the correction signal source based on the executed script, and receives the correction signal, which is further converted to a common format for the navigation subsystem in profile and script execution subsystem based on the profile.

10. The navigation data processing system of claim 9, wherein the data communication subsystem transmits/broadcasts the correction signal based on the executed script, where the correction signal is generated by conversion of navigation data from the navigation subsystem to the correction signal protocol in the profile and script execution subsystem based on a particular profile.

11. A navigation data processing system, comprising:
a navigation receiver that receives and processes a positioning signal from a satellite;
a data communication subsystem comprising a plurality of data communication units for transmitting a correction signal to external users;
the data communication subsystem further comprising a plurality of conversion interfaces for receiving the correction signal from the navigation receiver in a common format;
wherein the navigation receiver further comprises navigation subsystem which generates navigation data based on the positioning signal and generates a correction signal based on the navigation data; and
a user terminal that receives and displays the navigation data from the navigation receiver,
wherein the navigation receiver further comprises:
a profile database comprising a plurality of profiles, each profile corresponding to a particular protocol for transmitting or receiving the correction signal;
a script database comprising a plurality of scripts, each script comprising commands for controlling a particular data communication unit;
wherein the navigation receiver sets up communication for transmitting or broadcasting the correction signal, processes the positioning signal and generates the correction signal based on a script and a profile of the corresponding data communication unit and the corresponding interface converter.

12. The navigation data processing system of claim 11, wherein the navigation receiver further comprises a user variables database, the user variables database containing settings for the data communication units or protocols for receiving/transmitting a correction signal, and wherein values of variables in the user variables database are changed based on input from the user terminal.

13. The navigation data processing system of claim 12, further comprising a profile and script execution subsystem that receives profiles and scripts from the profiles database and the script database, and executes the scripts based on the profiles, and controls navigation data format conversion, and also controls values of the variables in the user variables database.

14. The navigation data processing system of claim 13, further comprising a command execution subsystem that executes commands for controlling the navigation subsystem, the user variables database and the profile and script execution subsystem.

15. The navigation data processing system of claim 14, wherein the data communication subsystem establishes a connection to the correction signal source based on the executed script, and receives the correction signal, which is further converted to a common format for the navigation subsystem in profile and script execution subsystem based on the profile.

16. The navigation data processing system of claim 15, wherein the data communication subsystem transmits/broadcasts the correction signal based on the executed script, where the correction signal is generated by conversion of navigation data from the navigation subsystem to the correction signal protocol in the profile and script execution subsystem based on a particular profile.

17. An apparatus to control data communication units in a navigation receiver comprising a data communication subsystem, further comprising:
a terminal,
a first output of the navigation receiver being connected to an input of the terminal, and a first input of the navigation receiver being connected to an output of the terminal;
a second output of the navigation receiver being connected to an input of the data communication subsystem, and a second input of the navigation receiver being connected to an output of data the data communication subsystem,
wherein the navigation receiver further comprises:
a profile database;
a script database;
a profile and script execution subsystem;
a user variables database;
a navigation subsystem;
a switch;
a command execution subsystem;
a user port;
interface converters for data communication units connection,
wherein:
a first input of the profile and script execution subsystem is connected to an output of the profile database,
a second input of the profile and script execution subsystem is connected to an output of the script database,
a third input of the profile and script execution subsystem is connected to a first output of navigation subsystem,
a fourth input of the profile and script execution subsystem is connected to a second output of the command execution subsystem,
a fifth input of profile and script execution subsystem is connected to an output of the switch,
a sixth input of profile and script execution subsystem is connected to a first output of user variables database;
a first output of the profile and script execution subsystem is connected to an input of the profile database,
a second output of the profile and script execution subsystem is connected to the input of the script database,
a third output of the profile and script execution subsystem is connected to a first input of the navigation subsystem,
a fourth output of the profile and script execution subsystem is connected to a second input of the command execution subsystem,
a fifth output of the profile and script execution subsystem is connected to a first input of the switch,
a sixth output of the profile and script execution subsystem is connected to a first input of user variables database, and
a seventh output of the profile and script execution subsystem is connected to a control fourth input of the switch;
a first input of the command execution subsystem is connected to the second output of user variables database,
a second input of which is connected to a first output of the command execution subsystem,
a third output of the command execution subsystem is connected to a second input of navigation subsystem,
a fourth output of the command execution subsystem is connected to a first input of the user port,
a fifth output of the command execution subsystem is connected to a second input of the switch,
a third input of the command execution subsystem is connected to a second output of navigation subsystem,
a fourth input of the command execution subsystem is connected to a first output of the user port, and
a fifth input of the command execution subsystem is connected to a second output of the switch;
third outputs of the switch are connected to corresponding first inputs of interface converters for data communication units that are used for connecting data communication subsystem, and
third inputs of the switch are connected to first outputs of the interface converters;
the second output of the user port is the first output of the navigation receiver, the second input of the user port is the first input of the navigation receiver;
the second outputs of the interface converters are the second outputs of the navigation receiver, and
the second inputs of interface converters are the second inputs of the navigation receiver.

18. The apparatus of claim 17, wherein
the second outputs and first inputs of the interface converters are outputs and inputs of data communication subsystem, respectively,
the first outputs of interface converters of data communication units are connected to the corresponding inputs of the data communication units, and
the second inputs of the interface converters are connected to the corresponding outputs of the data communication units.

19. The apparatus of claim 17, wherein the profile and script execution subsystem includes (i) buffer memory of the active profile, (ii) buffer memory of active scripts set,
a database for profile commands,
a database for script commands and the script and profile interpreter,
wherein
the first and second inputs of profile and script execution subsystem are respectively connected to the corresponding inputs of the script and profile interpreter via buffer memory of the active profile and buffer memory of active scripts set,
inputs of profile and script execution subsystem are connected to the corresponding inputs of script and profile interpreters via buffer memory blocks,
outputs of database for profile commands and database for script commands are correspondingly connected to the seventh and eighth inputs of the script and profile interpreter,
outputs of the script and profile interpreter are the corresponding outputs of profile and script execution subsystem,
the ninth and tenth outputs of the script and profile interpreter are correspondingly connected to the second inputs of buffer memory of the active profile and buffer memory of active scripts set.

20. The apparatus of claim 17, wherein the command execution subsystem includes five blocks of buffer memory, a command database, and a command interpreter,
wherein five inputs of the command execution subsystem are connected to corresponding inputs of the command interpreter via the buffer memory,
an output of the command database is connected to a sixth input of command interpreter, and
five outputs of the command interpreter are corresponding outputs of the command execution subsystem.

21. A navigation data processing system, comprising:
a data communication subsystem comprising a plurality of data communication units configured to receive a correction signal;
the data communication subsystem further comprising a plurality of conversion interfaces for converting the correction signal into a common format;
a navigation receiver configured to receive a positioning signal from a satellite and the correction signal from the data communication subsystem;
a profile database storing profiles of protocols for receiving the correction signal;
a script database comprising a plurality of scripts with commands for controlling a particular data communication unit, wherein the navigation receiver is configured to generate augmented navigation data from the positioning signal and the correction signal based on a script and a profile of the corresponding data communication unit and the corresponding interface converter; and
a user terminal configured to display the augmented navigation data.

22. A method of controlling data communication units in a navigation receiver comprising:
storing a set of scripts, a set of user variables and a set of profiles;
executing at least one of the scripts;
receiving commands from a terminal;
sending the commands to a navigation subsystem and to a script execution subsystem;
based on the received commands, accessing a corresponding profile;
based on the profile, executing corresponding scripts, using the values of the user variables,
wherein, during execution of the scripts:
(i) values of the user variables can be modified or received directly with the commands,
(ii) sending commands and control parameters that are generated in the script execution subsystem to data communication units, while correction data from the data communication units is sent to the script execution subsystem, and, after a format conversion, sending navigation data to the navigation subsystem,
(iii) sending data from the script execution subsystem to the terminal,
(iv) sending commands and control parameters from the script execution subsystem to the navigation subsystem;
(v) sending navigation data from the navigation subsystem to the script execution subsystem and, after a format conversion, to a corresponding data communication unit.

* * * * *